(12) United States Patent  (10) Patent No.: US 7,654,498 B1
Beltz  (45) Date of Patent: Feb. 2, 2010

(54) ARTICLE SUPPORT DEVICE

(76) Inventor: Kasey Dallas Beltz, 1262 Sunset Dr., Wichita, KS (US) 67212

( * ) Notice: Subject to any disclaimer, the term of this patent is extended or adjusted under 35 U.S.C. 154(b) by 268 days.

(21) Appl. No.: 11/408,483

(22) Filed: Apr. 22, 2006

Related U.S. Application Data

(60) Provisional application No. 60/674,168, filed on Apr. 23, 2005.

(51) Int. Cl.
*A47F 5/00* (2006.01)
*F41A 29/00* (2006.01)
(52) U.S. Cl. .................. 248/351; 248/354.1; 42/94; 89/37.04
(58) Field of Classification Search .............. 248/354.1, 248/351, 357; 42/94; 89/37.04, 37.01; 124/29
See application file for complete search history.

(56) References Cited

U.S. PATENT DOCUMENTS

| 879,052 | A | * | 2/1908 | Jeranek | 89/40.06 |
| 999,908 | A | * | 8/1911 | Tatro | 47/43 |
| 1,890,423 | A | * | 12/1932 | Teagarden | 42/94 |
| 2,844,905 | A | | 7/1958 | Musser et al. | |
| 3,012,350 | A | | 7/1961 | Lies | |
| 3,225,656 | A | * | 12/1965 | Flaherty et al. | 89/37.04 |
| 3,327,422 | A | | 6/1967 | Harris | |
| 3,999,461 | A | | 12/1976 | Johnson et al. | |
| 4,007,554 | A | * | 2/1977 | Helmstadter | 42/94 |
| 4,351,224 | A | | 9/1982 | Curtis | |
| 4,393,614 | A | | 7/1983 | Pickett | |
| 4,575,964 | A | * | 3/1986 | Griffin | 42/94 |
| 4,625,620 | A | | 12/1986 | Harris | |
| 4,987,694 | A | | 1/1991 | Lombardo | |
| 5,029,407 | A | | 7/1991 | Kirkpatrick | |
| 5,070,636 | A | * | 12/1991 | Mueller | 42/94 |
| 5,081,782 | A | | 1/1992 | Wright | |
| 5,194,678 | A | | 3/1993 | Kramer | |
| 5,345,706 | A | * | 9/1994 | Brown | 42/94 |
| 5,347,740 | A | | 9/1994 | Rather et al. | |
| 5,937,560 | A | | 8/1999 | Beltz | |
| 6,397,507 | B1 | * | 6/2002 | Marshall et al. | 42/72 |
| 6,875,161 | B1 | | 4/2005 | Brice | |
| 6,920,713 | B1 | * | 7/2005 | Love | 42/94 |

* cited by examiner

*Primary Examiner*—Kimberly T Wood
(74) *Attorney, Agent, or Firm*—Robert O. Blinn

(57) ABSTRACT

An article support device includes a cradle and a support shaft. The cradle includes a cradle portion and a slip yoke portion. The cradle portion presents an open channel for receiving and supporting an article such as a fire arm, a camera or telescope. The slip yoke portion is enclosed by a slip yoke wall. The slip yoke wall perforated by a strap receiving slot for receiving into the slip yoke an article carrying strap. The support shaft is fixed to the cradle and is for supporting the cradle in an elevated position above the ground.

6 Claims, 3 Drawing Sheets

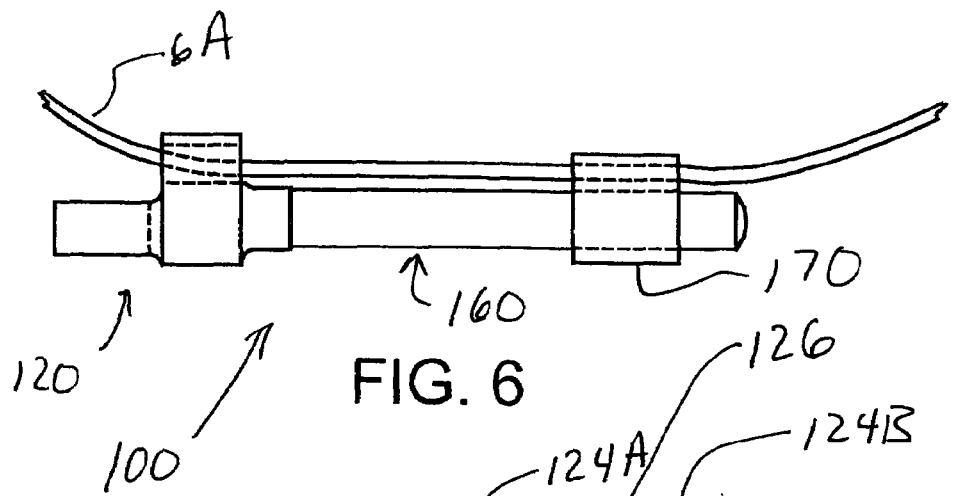
FIG. 6
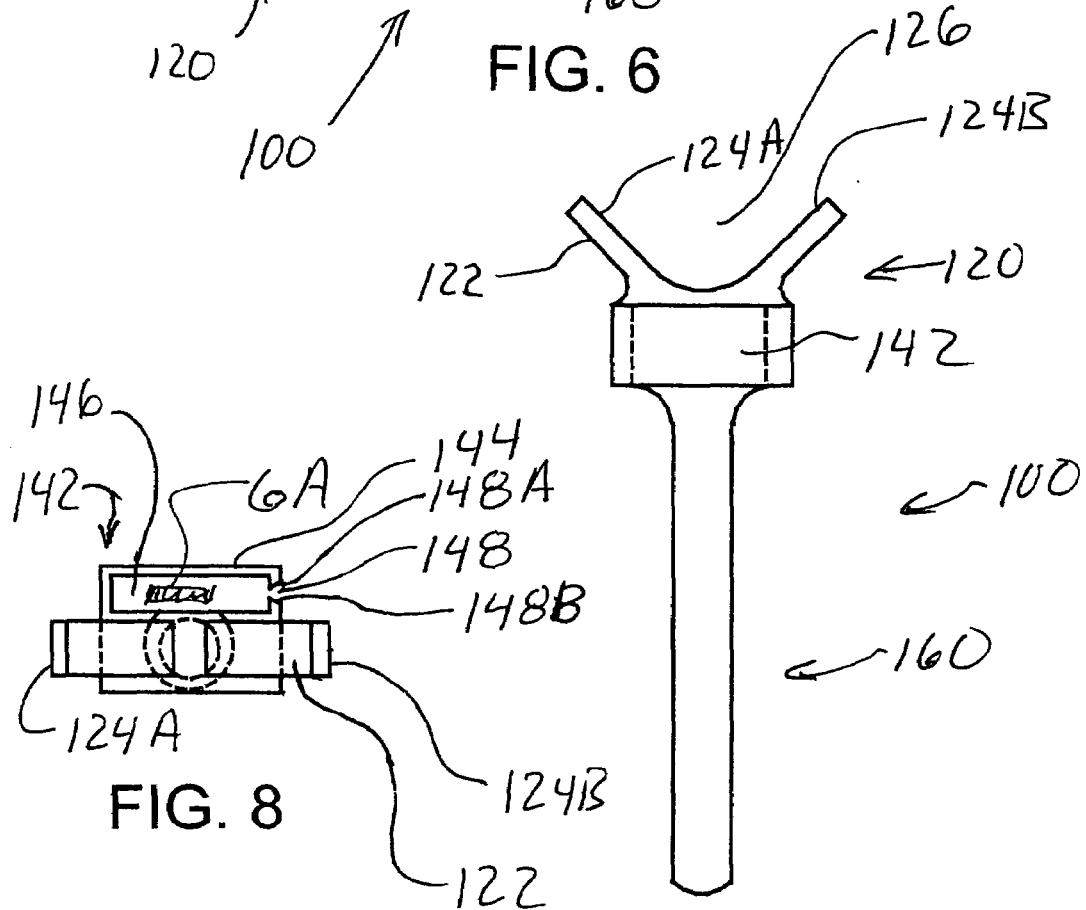
FIG. 8
FIG. 7

ARTICLE SUPPORT DEVICE

CROSS REFERENCES TO RELATED APPLICATIONS

This application claims the benefit of U.S. Provisional Patent Application No. 60/674,168 filed Apr. 23, 2005.

FIELD OF THE INVENTION

This invention relates to a support for supporting articles such as firearms and cameras.

BACKGROUND OF THE INVENTION

Relatively heavy articles and more particularly relatively heavy, elongated articles such as firearms, cameras having large telephoto lenses or telescopes can be difficult for a user to support during use. This is particularly the case when the user or operator is in a standing position and is holding the article at its proximate end. Accordingly, there has been a need for a support device for supporting heavy elongated articles at a support point that is spaced away from the proximate end of the article. Moreover, it would be useful if such a support were very compact, light and adapted for securing to a carrying strap that might be associated with the article, thus eliminating the need to carry and account for a separate accessory. This is particularly important for those using rifles, cameras or telescopes who have a need to deploy and use those articles rapidly. Thus, there is a need for a portable, compact support device for supporting an article which may be secured to a strap associated with the article so that the support device is readily available for immediate use.

BRIEF DESCRIPTION OF THE INVENTION

In an embodiment of the present invention the aforementioned needs are addressed by a support device for supporting articles such as for example, rifles, cameras and telescopes. The article that is supported by the support device preferably includes a carrying strap such as a sling strap in the case of a rifle. The support device includes a cradle and a support shaft. The cradle includes a cradle portion and a slip yoke portion. The cradle portion includes two opposing arms which diverge to present an open channel for receiving and supporting the article. The slip yoke portion is preferably proximate to the cradle portion. The slip yoke portion includes a slip yoke which is enclosed by a slip yoke wall. The slip yoke wall is preferably fashioned from a resilient, flexible material which can be deflected with manual pressure. The slip yoke wall is perforated by a strap receiving slot which communicates between the exterior and interior of the slip yoke. The strap receiving slot includes a converging entrance portion which is relatively wide toward the exterior of the slip yoke. When an article strap is urged into the converging entrance portion of the strap receiving slot, the strap receiving slot is urged open to allow the article strap to enter into the strap passageway. Once an article strap is captured by the slip yoke, it is retained during normal use until it is released by manually urging the strap receiving slot open to allow the article strap to be removed from the slip yoke.

The support shaft is fixed to the cradle and is for supporting the cradle in an elevated position above the ground. The support shaft is preferably light weight and is preferably comprised of telescoping members so that the support shaft may be extended for use and retracted into a small volume when not in use. A means for securing the end of the support shaft that is spaced away from the cradle portion may be added to the support shaft. Such a securing means might include a strap attach band that engages the article strap. With a slip yoke at the cradle end and a strap attach band spaced from the cradle end of the support device, the support device may be carried generally parallel to the article strap. Accordingly, the support device may be used to support an article such as a rifle, camera or telescope and yet also function as a compact, light weight, accessory which may be unobtrusively carried with the article strap.

BRIEF DESCRIPTION OF THE DRAWINGS

FIG. 6 is a side view of a second embodiment of the article support device shown with an article strap.

FIG. 7 is a front view of a second embodiment of the article support device.

FIG. 8 is a top view of a second embodiment of the article support device shown with an article strap

DETAILED DESCRIPTION

Figure 1:
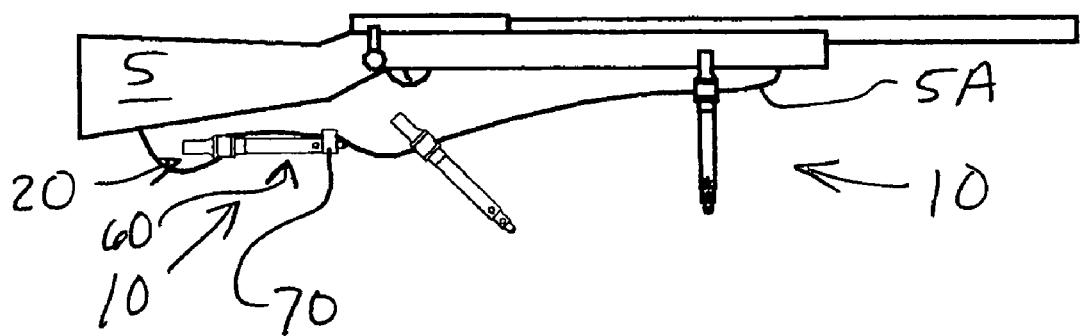
FIG. 1 is a side view of a first embodiment of the article support device shown in various positions in relation to an article and an article strap.
Figure 2:
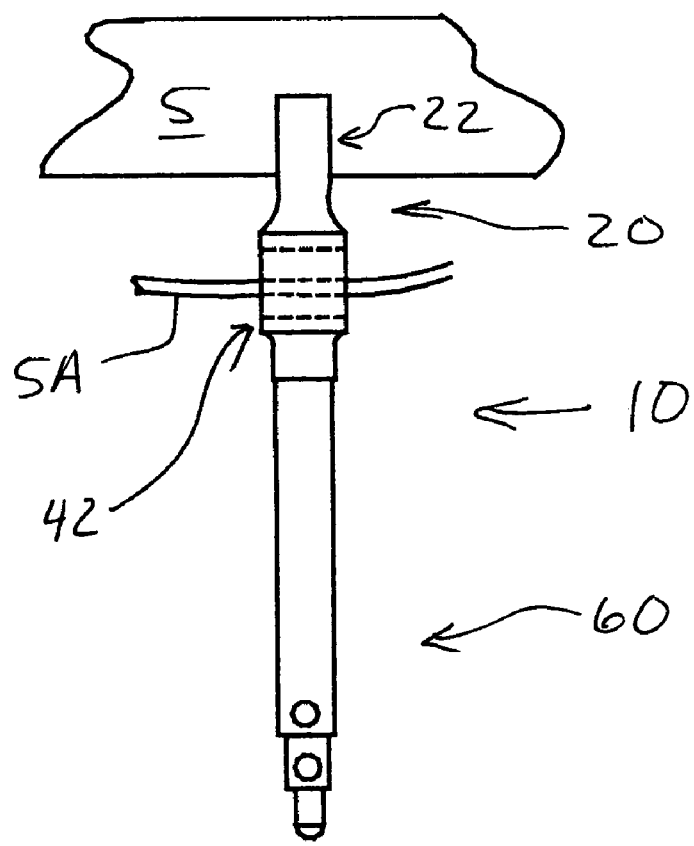
FIG. 2 is an enlarged side view of a first embodiment of the article support device shown supporting an article.

Referring to the drawings, FIGS. 1-5 illustrate a first embodiment of article support device 10. FIGS. 1 and 2 show article support device 10 in relation to an article, which in this case is a rifle 5. Rifle 5 also includes an article carrying strap 5A which is mounted at its opposite ends to the body of rifle 5. As can be seen in FIGS. 1 and 2, article support device 10 includes a cradle 20 and a support shaft 60.

Figure 3:
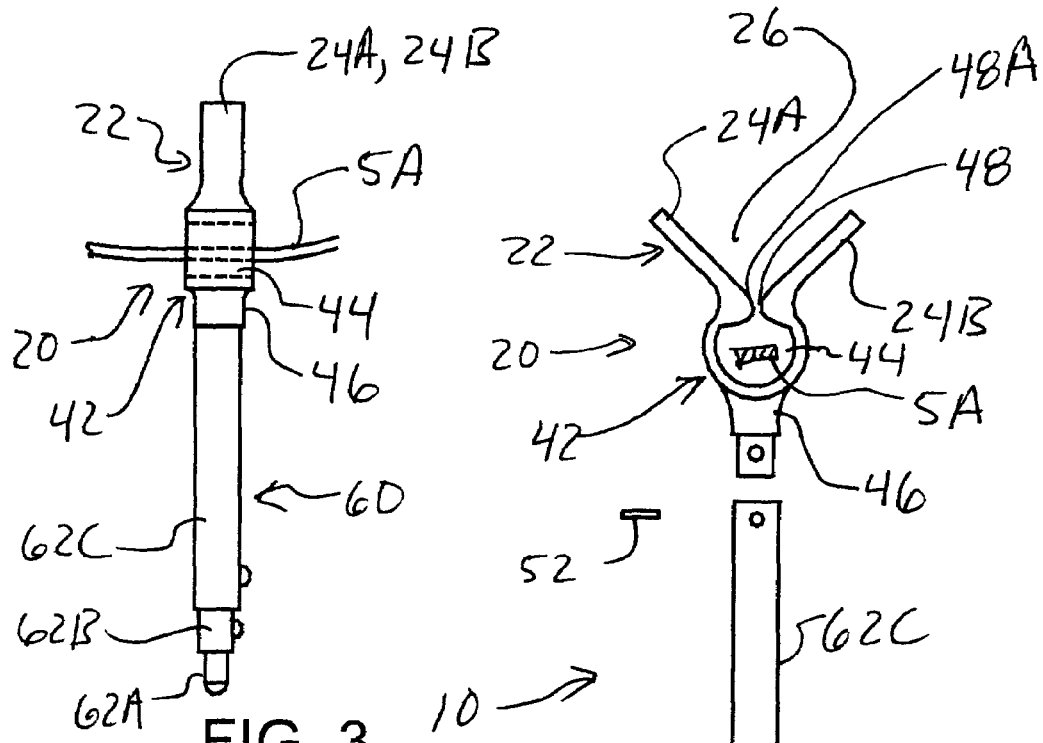
FIG. 3 is a side view of a first embodiment of the article support device shown with an article strap.
Figure 4:
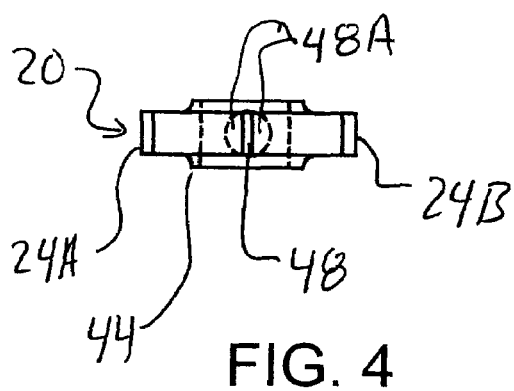
FIG. 4 is a top view of a first embodiment of the article support device.
Figure 5:
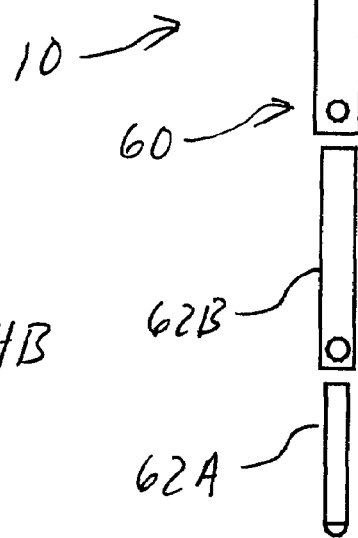
FIG. 5 is an exploded front view of a first embodiment of the article support device.

FIGS. 3-5 provide detailed views of article support device 10. As can be best seen in FIGS. 3 and 5, cradle 20 of support device 10 includes a cradle portion 22 and a slip yoke portion 42 and a base portion 44. Both cradle portion 22 and slip yoke portion 42 are defined by a pair of opposed cradle arms 24A and 24B which are fixed to a base portion 46. Cradle arms 24A and 24B diverge to define a slip yoke channel 44 for receiving article strap 5A. Cradle arms 24A and 24B then converge to define a strap receiving slot 48 which is preferably sufficiently narrow to prevent the escape of article strap 5A unless cradle arms 24A and 24B are urged apart. As can be seen in FIG. 5, strap receiving slot 48 communicates between the interior of slip yoke channel 44 and the exterior of slip yoke channel 44. Strap receiving slot 48 preferably includes a converging entrance portion 48A which is used to guide an article strap into the strap receiving slot 48. It is preferable that cradle arms 24A and 24B be fashioned from a flexible material such as a plastic material so that cradle arms 24A and 24B may be urged apart to allow passage of an article strap through strap receiving slot 48 between the exterior and the interior of slip yoke 44.

As can be seen in FIGS. 3-5, in the case of article support device 10, strap receiving slot 48 communicates with an open channel 26 which is defined by the diverging distal portions of cradle arms 24A and 24B. In the example shown in FIGS. 3-5, channel 26 is generally "V" shaped but may be shaped in any one of a large number of configurations adapted for receiving and holding various shapes and sizes of articles. A generally symmetrical shape for channel 26 is preferable because a symmetrical cradle may tend to hold an article in a balanced manner.

As can be best seen in FIG. 5, support shaft 60 is secured to the base 46 of cradle 20. This may be accomplished by means of a fastener 52 or any other suitable means for fixing support shaft 20 to cradle 20. Support shaft 60 in the example shown in FIG. 5 includes a plurality of interfitting telescoping members 62A, 62B and 62C which are preferably light weight and hollow.

Referring back to FIG. 1, support shaft 60 may also include a strap attach band 70 for securing article strap 5A to a portion of shaft 60 that is spaced away from cradle 20. Strap attach band 70 makes it possible to carry article support device 10 in a generally parallel orientation with article strap 5A.

Referring to the drawings, FIGS. 6-8 illustrate a second embodiment of the present invention, article support device 100. FIGS. 7 and 8 show article support device 100 in relation to an article strap 6A, which in this case is the sling strap of a rifle (not shown). As can be seen in FIGS. 7 and 8, article support device 100 includes a cradle 120 and a support shaft 160.

FIGS. 7 and 8 provide detailed views of article support device 100. As can be best seen in FIGS. 7 and 8, cradle 120 of support device 100 includes a cradle portion 122 and a slip yoke portion 142. As is shown in FIG. 7, cradle portion 122 includes a pair of opposed cradle arms 124A and 124B which diverge to define an open channel 126 for receiving and supporting an article.

Slip yoke portion 142 of cradle 120 is best illustrated in FIG. 8. FIG. 8 provides an end view of article support device 100. As can be seen in FIG. 8, slip yoke portion 142 includes a slip yoke wall 144 which encloses a slip yoke channel 146. Slip yoke wall 144 is perforated by a strap receiving slot 148 which communicates between the interior of slip yoke channel 146 and the exterior of slip yoke channel 146. Strap receiving slot 148 has converging walls 148A and 148B for receiving and guiding an article strap into slip yoke channel 146. Preferably, slip yoke wall 144 is fashioned from a resilient, flexible material which will yield under pressure. It is preferable to fashion strap receiving slot 148 to have a sufficiently narrow dimension such that converging walls 148A and 148B of strap receiving slot 148 must be urged apart before an article strap may be inserted into slip yoke channel 146. Once an article strap is inserted into slip yoke channel 146, it will generally remain captured during normal use unless strap receiving slot 148 is urged open to permit passage of the strap to the exterior of slip yoke channel 146.

As can be best seen in FIG. 7, support shaft 160 is secured to the base of cradle 120. Support shaft 160 of article support device 100 is shown in FIG. 7 as a simple elongated member primarily for ease of illustration. Article support device 100 may be reconfigured such that simple support shaft 160 may be replaced by a more complex support shaft such as support shaft 60 of article support device 10.

Referring back to FIG. 6, support shaft 160 may also include a strap attach band 170 for securing article strap 5A to a portion of shaft 160 that is spaced away from cradle 120. Strap attach band 170 makes it possible to carry article support device 100 in a generally parallel orientation with article strap 6A.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. A support device for supporting articles having an article strap attached thereto, the support device comprising:
    (a) a cradle including a cradle portion and a slip yoke portion, the cradle portion including two opposing arms which diverge to present an open channel for receiving and supporting an article, the slip yoke portion including a slip yoke channel which is enclosed by a slip yoke wall, the slip yoke wall perforated by a strap receiving slot which communicates between the exterior and the interior of the slip yoke channel, the strap receiving slot including a converging entrance portion which is relatively wide toward the exterior of the slip yoke channel and relatively narrow toward the interior of the slip yoke channel, the converging entrance portion sufficiently flexible such that when an article strap is urged into the converging entrance portion of the strap receiving slot, the strap receiving slot is urged open to allow the article strap to enter into the slip yoke channel, and,
    (b) a support shaft fixed to the cradle for supporting the cradle in an elevated position above the ground.

2. The support device of claim 1, wherein;
    the support shaft includes at least two telescoping members.

3. The support device of claim 1, further comprising;
    a strap attach band that is spaced away from the cradle for engaging the article strap at a second location spaced away from the slip yoke portion.

4. A support device for supporting articles having an article strap attached thereto, the support device comprising:
    (a) a cradle including a cradle portion, a slip yoke portion and a base portion, the cradle portion and the slip yoke portion integrally defined by a pair of opposed cradle arms that are fixed to the base portion, the cradle arms defining the walls of a slip yoke channel, the cradle arms also converging to define a strap receiving slot adapted for receiving an article strap into the slip yoke channel, the strap receiving slot communicating between the interior of the slip yoke channel and the exterior of the slip yoke channel, the cradle arms also diverging from the strap receiving slot to define an open channel for receiving the article, the strap receiving slot including a converging entrance portion which is relatively wide toward the exterior of the slip yoke channel and relatively narrow toward the interior of the slip yoke channel, the converging entrance portion of the strap receiving slot sufficiently flexible such that when an article strap is urged into the converging entrance portion of the strap receiving slot, the strap receiving slot is urged open to allow the article strap to enter into the slip yoke channel, and,
    (b) a support shaft fixed to the base portion of the cradle for supporting the cradle.

5. The support device of claim 4, wherein;
    the support shaft includes a plurality of interfitting telescoping members.

6. The support device of claim 4, further comprising;
    a strap attach band spaced away from the cradle for engaging the article strap at a second location spaced away from the slip yoke.

\* \* \* \* \*